(12) United States Patent
Pauli et al.

(10) Patent No.: US 7,477,697 B2
(45) Date of Patent: Jan. 13, 2009

(54) MULTIPLEXING METHOD IN A MULTI CARRIER TRANSMIT DIVERSITY SYSTEM

(75) Inventors: Mathias Pauli, Nürnberg (DE); Eric Sachse, Dresden (DE); Udo Wachsmann, Schwabach (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 973 days.

(21) Appl. No.: 10/471,825

(22) PCT Filed: Mar. 1, 2002

(86) PCT No.: PCT/EP02/02245

§ 371 (c)(1),
(2), (4) Date: Sep. 15, 2003

(87) PCT Pub. No.: WO02/073869

PCT Pub. Date: Sep. 19, 2002

(65) Prior Publication Data

US 2004/0120416 A1 Jun. 24, 2004

(30) Foreign Application Priority Data

Mar. 14, 2001 (EP) .................................. 01105482

(51) Int. Cl.
*H04L 1/02* (2006.01)
*H04B 7/02* (2006.01)

(52) U.S. Cl. .................. 375/267; 375/130; 375/260
(58) Field of Classification Search .............. 375/267, 375/375, 285, 355, 260; 360/53
See application file for complete search history.

(56) References Cited

U.S. PATENT DOCUMENTS

| 5,563,746 | A | * | 10/1996 | Bliss | ............................ | 360/53 |
| 6,088,408 | A | | 7/2000 | Calderbank et al. | .......... | 375/347 |
| 6,359,923 | B1 | * | 3/2002 | Agee et al. | ................... | 375/130 |
| 6,587,526 | B1 | * | 7/2003 | Li et al. | ...................... | 375/355 |
| 6,792,049 | B1 | * | 9/2004 | Bao et al. | .................... | 375/285 |
| 6,952,454 | B1 | * | 10/2005 | Jalali et al. | ................... | 375/260 |
| 2004/0120416 | A1 | * | 6/2004 | Pauli et al. | .................... | 375/267 |

OTHER PUBLICATIONS

Mudulodu et al; "A Transmit Diversity Scheme for Frequency Selective Fading Channels"; Globecom '00—IEEE Global Telecommunications Conference. Conference Record (CAT. No. 00CH37137), Proceedings Global Telecommunications Conference, San Francisco, CA, Nov. 27-Dec. 1, 2000, pp. 1089-1093, vol. 2, XP002172508.

(Continued)

*Primary Examiner*—Huy D Vu
*Assistant Examiner*—David Oveissi
(74) *Attorney, Agent, or Firm*—Nixon & Vanderhye P.C.

(57) ABSTRACT

The invention relates to a method of multiplexing data words in a multicarrier transmit diversity system. The method comprises the step of generating a plurality of data blocks, each data block comprising data words and each data word containing data symbols derived from a data signal, the step of determining for one or more data blocks in dependence on at least one transmission constraint if the data words of said one or more data blocks are to be multiplexed in the time domain or in the frequency domain and the step of multiplexing the data words of the data blocks in accordance with the determination result.

27 Claims, 5 Drawing Sheets

OTHER PUBLICATIONS

Lee et al; A Space-Frequency Transmitter Diversity Technique for OFDM Systems, Globecom '00—IEEE. Global Telecommunications Conference. Conference Record (CAT. No.))CH371737), Proceedings of Global Telecommunications Conference, San Francisco, CA, Nov. 27-Dec. 1, 2000., pp. 1473-1477, vol. 3, XP002172509.

Alamouti: A Simple Transmit Diversity Technique for Wireless Communications; IEEE Journal on Selected Areas in Communications', IEEE Inc. New York, vol. 16, No. 8, Oct. 1998, pp. 1451-1458, XP002100058.

Li et al; "Transmitter Diversity for OFDM Systems and its Impact on High-Rate Data Wireless Networks"; Journal on Selected Areas in Communications, vol. 17, No. 7, Jul. 1999, pp. 1233-1243.

Technical Report, Broadband Radio Access Networks (BRAN); Hiperlan Type 2; System Overview, ETSI TR 101 683, V1.1.1, Feb. 2000, pp. 1-19.

Technical Specification, Broadband Radio Access Networks (BRAN); Hiperlan Type 2; Physical (PHY)Layer; ETSI TS 101 475, V1.1.1, Apr. 2000, pp. 1-40.

* cited by examiner

| modulation scheme | code rate | bit rate |
|---|---|---|
| BPSK | 1/2 | 6 Mbps |
| BPSK | 3/4 | 9 Mbps |
| QPSK | 1/2 | 12 Mbps |
| QPSK | 3/4 | 18 Mbps |
| 16-QAM | 9/16 | 27 Mbps |
| 16-QAM | 3/4 | 36 Mbps |
| 64-QAM | 3/4 | 54 Mbps |

MULTIPLEXING METHOD IN A MULTI CARRIER TRANSMIT DIVERSITY SYSTEM

This application is the US national phase of international application of PCT/EP02/02245 filed 1 Mar. 2002, which designated the US.

TECHNICAL FIELD

The present invention relates to the field of transmit antenna diversity and in particular to a method of multiplexing data words in a multi carrier transmit diversity system. The invention also relates to a multiplexer for multiplexing a sequence of data symbols and a demultiplexer for demultiplexing a multiplexed sequence of data symbols.

BACKGROUND

Peak transmission rates in wireless communication systems have steadily increased during the last years. However, peak transmission rates are still limited for example due to path loss, limited spectrum availability and fading.

Transmitter diversity is a highly effective technique for combating fading in wireless communications systems. Several different transmit diversity schemes have been proposed. In Li, Y.; Chuang, J. C.; Sollenberger, N. R.: Transmitter diversity for OFDM systems and its impact on high-rate data wireless networks, IEEE Journal on Selec. Areas, Vol. 17, No. 7, July 1999 the transmit diversity schemes of delay, permutation and space-time coding are examplarily described. According to the delay approach, a signal is transmitted from a first transmitter antenna and signals transmitted from further transmitter antennas are delayed versions of the signal from the first transmitter antenna. In the permutation scheme, the modulated signal is transmitted from a first transmitter antenna and permutations of the modulated signal are transmitted from further transmitter antennas. By means of space-time coding a signal is encoded into several data words and each data word is transmitted from a different transmitter antenna. During transmission the data words are spread (or multiplexed) in the time domain by successively transmitting the data symbols of a data word over a single carrier frequency.

A further transmit diversity scheme for a multicarrier system is space-frequency coding. By means of space-frequency coding a signal is encoded into several data words and each data word is spread (or multiplexed) in the frequency domain by transmitting the data symbols of each data word on orthogonal frequencies, i.e. orthogonal subcarriers. An exemplary scheme for space-frequency coding is described in Mudulodu, S.; Paulraj, A.: A transmit diversity scheme for frequency selective fading channels, Proc. Globecom, San Francisco, pp. 1089-1093, November 2000. According to the multicarrier system described in this paper, the data words relating to an encoded signal are preferably multiplexed in the time domain although orthogonal frequencies are available and the data words could thus also be multiplexed in the frequency domain. This is due to the fact that if multiplexing in the frequency domain is utilized the employed frequencies, i.e. subcarriers, must see the same channel, which may not always be possible in a frequency selective fading channel. However, in case the subcarriers experience the same channel, it is stated that either multiplexing in the time domain or multiplexing in the frequency domain or a combination of the two may be used. By combining multiplexing in the time domain and in the frequency domain the data symbols of a data word are simultaneously multiplexed in the time domain and in the frequency domain. This means that the data word is spread both across time and across frequencies.

Departing from the various transmit diversity schemes hitherto known there is a need for a method of multiplexing data words in a multicarrier transmit diversity system which can easily be adapted to the specifications of different wireless communications systems. There is also a need for a corresponding multiplexer and a demultiplexer.

SUMMARY

The existing need is satisfied by a method of multiplexing data words in a multicarrier transmit diversity system which comprises the step of generating a plurality of data blocks, each data block comprising data words and each data word containing data symbols derived from a data signal, the step of determining for one or more of the data blocks in dependence on at least one transmission constraint if the data words of said one or more data blocks are to be multiplexed in a time domain or in a frequency domain and the step of multiplexing the data words of the data blocks in accordance with the result of the determination.

The multiplexing method is not restricted to a specific transmit diversity scheme as long as the utilized transit diversity scheme enables to generate from a data signal a plurality of data blocks having the above structure. For example, the transmit diversity schemes of block coding and of permutation allow to generate such data blocks. Preferably, the generated data blocks have the structure of a matrix similar to a space-time block code (STBC) matrix. Also, it is not required that the transmit diversity scheme guarantees full transmit diversity. In other words, each information symbol comprised within the data signal need not be transmitted from each transmitter antenna. Nonetheless, a preferred example embodiment comprises the feature of full transmit diversity.

Moreover, the technology is not restricted to any number of transmit and receive antennas. Preferably, the number of data words per data block equals the number of transmit antennas such that each data word of a data block may be transmitted from an individual transmitter antenna. If more than one receive antenna is provided, the receive diversity scheme of maximum-ratio combining can be applied. However, other receive diversity schemes may be used as well.

It is decided on a data block level how the data words are to be multiplexed. The decision on the data block level allows to change the multiplexing domain from one data block to a subsequent data block which is advantageous if one has to cope with specific predefined or varying transmission constraints. Also, the multiplexing can be applied in various wireless communication systems without major changes due to the specific multiplexing flexibility gained by selecting the multiplexing domain on the data block level. The multiplexing domain can be determined for each data block individually or simultaneously for a plurality of data blocks. For example, it can be decided for a sequence of data blocks that all data words comprised within the sequence of data blocks are to be multiplexed in either the time domain or in the frequency domain.

The multiplexing domain is determined by taking into account one or more transmission constraints. For example, the transmission constraints may comprise one or more physical transmission constraints or one or more data-related transmission constraints. It can also comprise both one or more physical transmission constraints and one or more data-related transmission constraints. The physical transmission constraints relate to the physical transmission conditions and can be derived from physical transmission parameters like a channel coherence bandwidth or a coherence time. The data-related transmission constraints relate to system specific constraints regarding for example the employed multiplexing scheme for the data words, the structure of the data signal, the structure of the data blocks, the structure of the data words or the structure of the data symbols.

The data symbols may be derived from the data signal in various ways dependent on the transmit diversity scheme which is used. If, for example, the transmit diversity scheme of permutation is used, the data symbols contained in the data words are permutations of information symbols comprised within the data signal. As a further example, if the transmit diversity scheme of block coding is used, the data symbols contained in the data words are obtained from the information symbols comprised within the data signal by means of permutation and basic arithmetic operations, such as negation and complex conjugation.

The data signal from which the one or more data blocks are generated can have any format. According to a preferred example embodiment, the data signal has the format of a sequence of discrete information symbols. For example, the data signal may have the structure of vectors, each vector comprising a predefined number of information symbols. The nature of the information symbols may depend on the specific wireless communication system in which the multiplexing method according to the invention is used. Many wireless communication systems employ different types of information symbols for different purposes. For example, some wireless communication systems use data signals which comprise a preamble, one or more user data sections or both a preamble and one or more user data sections. Usually, the preamble has a predefined structure and is utilized for purposes like channel estimation, frequency synchronization and timing synchronization.

In the following, several example data-related transmission constraints are described in more detail. According to a first example embodiment, the data-related transmission constraint is a predefined number N of data symbols to be comprised within each data word which is to be multiplexed in the time domain. Usually, the number N of data symbols to be comprised within each data word cannot arbitrarily be chosen because it may depend for example on a code rate, on the condition that the data blocks have to be orthogonal matrices or on the availability of memory resources within the multi-carrier transmit diversity system.

When the data words of a specific data block are to be multiplexed in the time domain, the number N of data symbols to be comprised within each data word may represent the number of time slots required for the transmission of a single data word over a single subcarrier. On the other hand, when the data words of a specific data block are to be multiplexed in the frequency domain, the number N of data symbols to be comprised within each data word stands for the number of subcarriers required to transmit a single data word during a single time slot.

Preferably, all data words of an individual data block comprise the same number of data symbols. If the data signal has such a structure that the number of data symbols comprised within each data word of a specific data block equals the predefined number N of data symbols, the data words of this data block may be multiplexed in the time domain. Otherwise, i.e. if the data signal has such a structure that the number of data symbols comprised within each data word of a specific data block does not equal the predefined number N of data symbols, the data words of this data block may be multiplexed in the frequency domain. Such a distinction will become necessary if the data signal or a portion thereof has a predefined length because the predefined length may imply that the total number $N_D$ of data symbols which corresponds to the predefined length of the data signal or a portion thereof is not an integer multiple of the predefined number N of data symbols which should be comprised within a data word to be multiplexed in the time domain. In such a situation integer multiples of the predefined number N of data symbols are arranged in data blocks of data words which are multiplexed in a time domain and a remainder $N_R=\mathrm{mod}(N_D/N)$ of data symbols is arranged in a data block with data words which are multiplexed in the frequency domain.

Thus, by combining multiplexing in the time domain and in the frequency domain, data symbol fitting problems resulting from the predefined number N of data symbols to be comprised within each data word which is to be multiplexed in the time domain can be solved. Such data symbol fitting problems may for example become relevant when the data signal or a portion of the data signal has a predefined length because the wireless transmission system necessitates that the preamble portion or the user data portion of a data signal comprises a certain number of information symbols. Thus the data words of all data blocks except for the last data block are multiplexed in the time domain and the data words of the last data block are either multiplexed in the time domain or in the frequency domain depending on whether or not the data words of the last data block contain a number of data symbols which equals the predefined number N of data symbols.

So far the data-related transmission constraint of a predefined number N of data symbols to be comprised within each data word has been illustrated. According to a second example embodiment, the data signal may comprise one or more periodic structures and the data related transmission constraint may be a preservation of the periodic structures such that the periodic structures are still periodic on a receiver side. The one or more periodic structures may be comprised within a preamble of the data signal, for example in the form of two or more identical preamble information symbols. Periodic structures are advantageous because they allow the use of synchronization algorithms with comparatively low complexity.

In case of multiplexing data symbols relating to periodic structures in the time domain the periodicity of the periodic structures may get lost. Therefore, at least the data words of data blocks which relate to the periodic structures or parts of periodic structures are multiplexed in the frequency domain. By multiplexing the data words of these data blocks in the frequency domain it can be ensured that the periodicity of the periodic structures is maintained.

When the data words of data blocks generated from periodic structures or portions thereof are multiplexed in the frequency domain, the data words of data blocks generated from the remaining data signal are preferably multiplexed in the time domain. If, for example, the data words of data blocks generated from a preamble comprising periodic structures are multiplexed in the frequency domain, the data words of data blocks generated from a corresponding user data section may be multiplexed at least partly in the time domain.

Instead of data-related transmission constraints or in addition to data-related transmission constraints physical transmission constraints can be taken into account when deciding if the data words of one or more specific data blocks are to be multiplexed in the time domain or in the frequency domain. According to a preferred embodiment, the decision is made based on simultaneously evaluating a combination of one or more data-related transmission constraints and one or more physical transmission constraints.

The physical transmission constraints may be determined based on at least one of a channel coherence bandwidth $$B_C \approx 1/\tau_{rms} \quad (1)$$

and a coherence time $$t_c \approx 1/(2 \cdot f_D) \quad (2)$$

wherein $f_D$ is the doppler frequency and $\tau_{rms}$ is the root mean square of the delay spread of the channel impulse response.

Many transmit diversity schemes require constant or at least approximately constant channel parameters during transmission of one data word. If the data words are to be multiplexed in the frequency domain, a comparatively large coherence bandwidth is required. This means that the relation $$B_C >> N/T \quad (3)$$

has to be fulfilled at least approximately, wherein N is the number of data symbols per data word and T is the duration of one of the data symbols, i.e. the duration of one time slot. A comparatively large coherence bandwidth requires that the channel parameters of N adjacent subcarriers have to be almost constant.

On the other hand, if the data words are to be multiplexed in the time domain, a comparatively large coherence time is required. This means that the relation $$t_c >> T \cdot N \quad (4)$$

has to be fulfilled at least approximately. In other words: N subsequent data symbols have to have nearly constant channel parameters, i.e. the channel parameters for a single subcarrier have to remain constant for a period of N·T.

The physical transmission constraint may be determined by assessing if one or both of the relations (3) and (4) are fulfilled. Dependent on which of the two relations (3) and (4) is fulfilled best it is decided that the data words of the data blocks are to be multiplexed either in the time domain or in the frequency domain as a general rule. Deviations from this general rule may become necessary due to data-related transmission constraints. For example, the data symbol fitting problem or the problem encountered with periodic structures may necessitate that although multiplexing in the time domain is generally to be preferred, the data words of at least some data blocks have to be multiplexed in the frequency domain. As a further example, changing transmission conditions may necessitate that the data words of some data blocks have to be multiplexed in the time domain and the data words of other data blocks have to be multiplexed in the frequency domain. As a third example, the data words of data blocks generated from a preamble may be multiplexed in the time domain and the data words of data blocks generated from a user data section may be multiplexed in the frequency domain. Such a combination has the advantage that the above-mentioned data symbol fitting problem, which usually is most relevant for the user data section, can be avoided while the multiplexing in the time domain of the data words of data blocks generated from the preamble allows a good channel estimation.

It was mentioned above that in order to achieve full diversity each information symbol has to be transmitted from each transmitter antenna. A further requirement of full transmit diversity is that the antenna signals are orthogonal to each other. This means that the data symbols have to be modulated onto subcarriers which are orthogonal to each other. However, the subcarriers need not be orthogonal.

DETAILED DESCRIPTION

Although the technology can be used in any multicarrier transmit diversity system which employs a transmit diversity scheme allowing to generate data blocks having a structure as described above, the following description of example embodiments is set forth with respect to a multicarrier system which employs orthogonal frequency division multiplexing (OFDM) and which utilizes block coding for generating data blocks from a data signal.

The example multicarrier system described below is derived from the European wireless local area network (WLAN) standard high performance radio local area network type 2 (HIPERLAN/2). HIPERLAN/2 systems are intended to be operated in the 5 GHz frequency band. A system overview of HIPERLAN/2 is given in ETSI TR 101 683, Broadband Radio Access Networks (BRAN); HIPERLAN Type 2; System Overview, V1.1.1 (2000-02) and the physical layer of HIPERLAN/2 is described in ETSI TS 101 475; Broadband Radio Access networks (BRAN); HIPERLAN Type 2; Physical (PHY) Layer, V1.1.1 (2000-04). The multicarrier scheme of OFDM, which is specified in the HIPERLAN/2 standard, is very robust in frequency selective environments.

Up to now, the HIPERLAN/2 system and many other wireless communications systems do not support transmit diversity in spite of the fact that transmit diversity would improve the transmission performance and reduce negative effects of fast fading like Rayleigh fading. However, applying standard transmit diversity schemes to multicarrier communications systems may lead to various problems which are hereinafter described with respect to the HIPERLAN/2 system.

Figure 1:
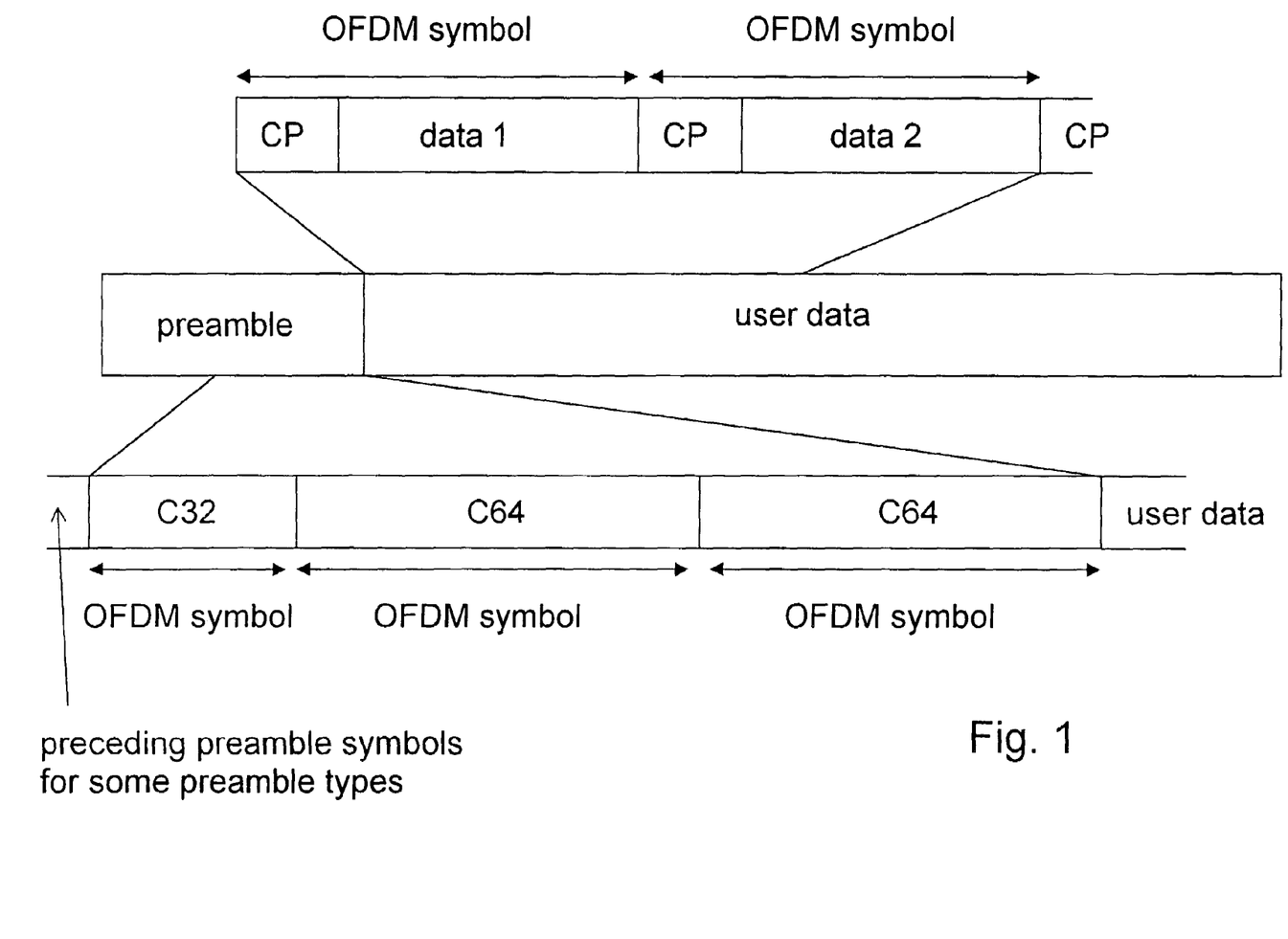
FIG. 1 shows a data signal in the form of a physical burst to be processed.

In FIG. 1 a typical physical burst of HIPERLAN/2 is illustrated. The physical burst comprises a preamble consisting of preamble symbols and a user data section consisting of user data symbols. In HIPERLAN/2 five different physical bursts are specified and each kind of physical burst has a unique preamble. However, the last three preamble symbols constitute a periodic structure which is identical for all preamble types. This periodic structure consists of a short OFDM symbol C32 of 32 samples followed by two identical regular OFDM symbols C64 of 64 samples. The short OFDM symbol C32 is a cyclic prefix which is a repetition of the second half of one of the C64 OFDM symbols. The so-called C-preamble depicted in FIG. 1 is used in HIPERLAN/2 for channel estimation, frequency synchronization and timing synchronization. The periodic structure within the C-preamble is necessary in order to allow the use of synchronization algorithms with comparatively low complexity.

The user data section of the physical burst depicted in FIG. 1 comprises a variable number $N_{SYM}$ of OFDM symbols required to transmit a specific protocol data unit (PDU) train. Each OFDM symbol of the user data section consists of a cyclic prefix and a useful data part. The cyclic prefix consists of a cyclic continuation of the useful data part and is inserted before it. Thus, the cyclic prefix is a copy of the last samples of the useful data part. The length of the useful data part is equal to 64 samples and has a duration of 3.2 μs. The cyclic prefix has a length of either 16 (mandatory) or 8 (optional) samples and a duration of 0.8 μs or 0.4 μs, respectively. Altogether, a OFDM symbols thus has a length of either 80 or 72 samples corresponding to a symbol duration of 4.0 μs or 3.6 μs, respectively. An OFDM symbol therefore has an extension in the time domain. A OFDM symbol further has an extension in the frequency domain. According to HIPERLAN/2, a OFDM symbol extends over 52 subcarriers. 48 subcarriers are reserved for complex valued subcarrier modulation symbols and 4 subcarriers are reserved for pilots.

From the above it becomes clear that the HIPERLAN/2 physical burst depicted in FIG. 1 has a predefined length both in a time direction and in a frequency direction. Moreover, the physical burst of FIG. 1 comprises a periodic structure. It are among others these features of the physical burst of FIG. 1 which may lead to problems when the HIPERLAN/2 system or a similar wireless communication system has to be adapted to transmit diversity.

For typical HIPERLAN/2 scenarios the above relation (4) is usually fulfilled because the doppler frequency $f_D$ is comparatively low. However, especially in outdoor environments, relatively large delay spreads can occur. Consequently, relation (3) cannot always be fulfilled. Therefore, a transmit diversity scheme like STBC multiplexing in the time domain should generally be a preferred transmit diversity scheme for a HIPERLAN/2 scenario from the point of view that the channel over one space-time data word should be as constant as possible. However, severe problems arise when STBC is applied to physical bursts having the structure depicted in FIG. 1 or a similar structure.

Both the physical burst and the OFDM symbols comprised therein have predefined dimensions in the time domain and in the frequency domain. Concurrently, STBC requires that each STBC data word has a predetermined length N. Thus, data unit fitting problems arise if the dimension of e.g. an OFDM symbol of the preamble or of the user data section cannot be mapped on an integer multiple of the length of one STBC data word. Moreover, when applying STBC to the periodic C-preamble depicted in FIG. 1, the periodicity of the C-preamble gets lost. This is due to the fact that the one or more STBC data words relating to the second C64 OFDM symbol will no longer be equal to the one or more STBC data words relating to the first C64 OFDM symbol. The loss of periodicity, however, leads to the problem that the symbol synchronization algorithms which make use of a periodic structure within the preamble can no longer be employed. Also, the C32 OFDM symbol cannot serve any longer as a guard interval separating the OFDM symbols within the preamble. The reason therefore is that in case of multipath propagation the first C64 OFDM symbol interferes with the second C64 OFDM symbol which is no longer equal to the first C64 OFDM symbol.

Figure 2:
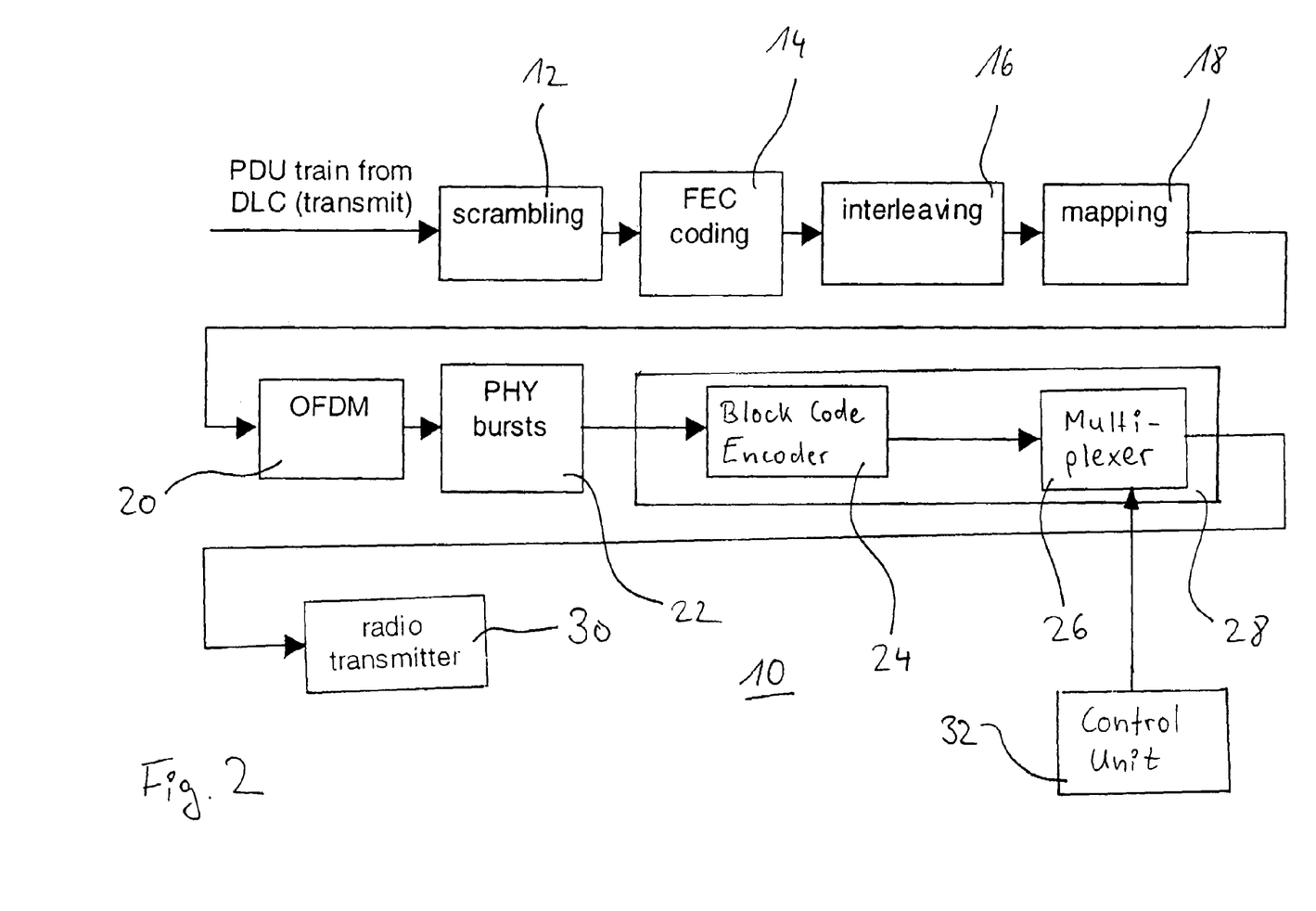
FIG. 2 is a block diagram of a transceiver for wireless communication adapted to multiplex data words.

The above problems and further problems not explicitly discussed above do not occur when the data words are multiplexed. In FIG. 2, the physical layer of a transceiver 10 is illustrated that comprises a scrambler 12, an FEC coding unit 14, an interleaving unit 16, a mapping unit 18, an OFDM unit 20, a burst forming unit 22, a block code encoder 24, a multiplexer 26, a radio transmitter 30 and a control unit 32. The block code encoder 24 and the multiplexer 26 together form an encoder/multiplexer unit 28.

The transceiver 10 depicted in FIG. 1 receives as input signal a PDU train from a data link control (DLC). Each PDU train consists of information bits which are to be framed into a physical burst, i.e. a sequence of OFDM symbols to be encoded, multiplexed and transmitted.

Figure 3:
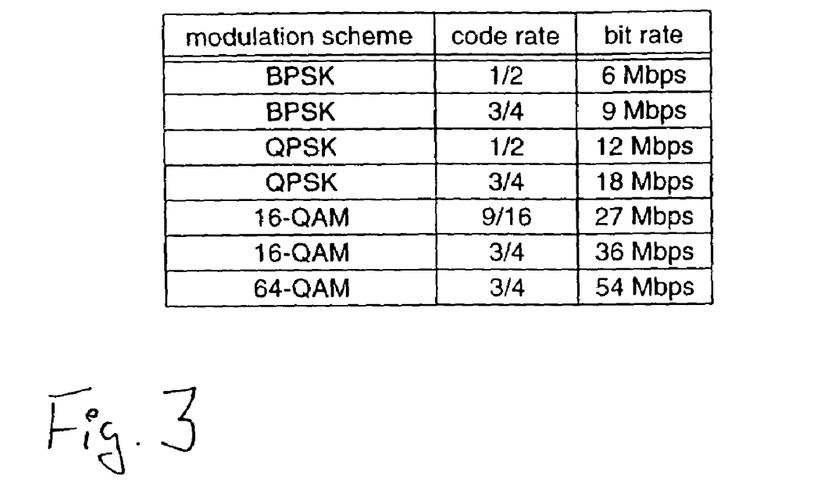
FIG. 3 shows several modulation schemes defined in the HIPERLAN/2 standard.

Upon receipt of a PDU train the transmission bit rate within the transceiver 10 is configured by choosing an appropriate physical mode based on a link adaption mechanism. A physical mode is characterized by a specific modulation scheme and a specific code rate. In the HIPERLAN/2 standard several different coherent modulation schemes like BPSK, QPSK, 16-QAM and optional 64-QAM are specified. Also, for forward error control, convolutional codes with code rates of ½, 9/16 and ¾ are specified which are obtained by puncturing of a convolutional mother code of rate ½. The possible resulting physical modes are depicted in FIG. 3. The data rate ranging from 6 to 54 Mbit/s can be varied by using various signal alphabets for modulating the OFDM subcarriers and by applying different puncturing patterns to a mother convolutional code.

Once an appropriate physical mode has been chosen, the $N_{BPDU}$ information bits contained within the PDU train are scrambled with the length-127 scrambler 12. The scrambled bits are then output to the FEC coding unit 14 which encodes the $N_{BPDU}$ scrambled PDU bits according to the previously set forward error correction.

The encoded bits output by the FEC coding unit 14 are input into the interleaving unit 16 which interleaves the encoded bits by using the appropriate interleaving scheme for the selected physical mode. The interleaved bits are input into the mapping unit 18 where sub-carrier modulation by mapping the interleaved bits into modulation constellation points in accordance with the chosen physical mode is performed. As mentioned above, the OFDM subcarriers are modulated by using BPSK, QPSK, 16-QAM or 64-QAM modulation depending on the physical mode selected for data transmission.

The mapping unit 18 outputs a stream of complex valued subcarrier modulation symbols which are divided in the OFDM unit in groups of 48 complex numbers. In the OFDM unit a complex base band signal is produced by OFDM modulation as described in ETSI TS 101 475, Broadband Radio Access Networks (BRAN); HIPERLAN Type 2; Physical (PHY) Layer, V1.1.1 (2000-04).

The complex base band OFDM symbols generated within the OFDM unit 20, where pilot subcarriers are inserted, are input into the physical burst unit 22, where an appropriate preamble is appended to the PDU train and the physical burst is built. The physical burst produced by the physical burst unit 22 has a format as depicted in FIG. 1. The physical burst unit 22 thus outputs a sequence of complex base band OFDM symbols in the form of the physical burst to the block code encoder 24.

Figure 4:
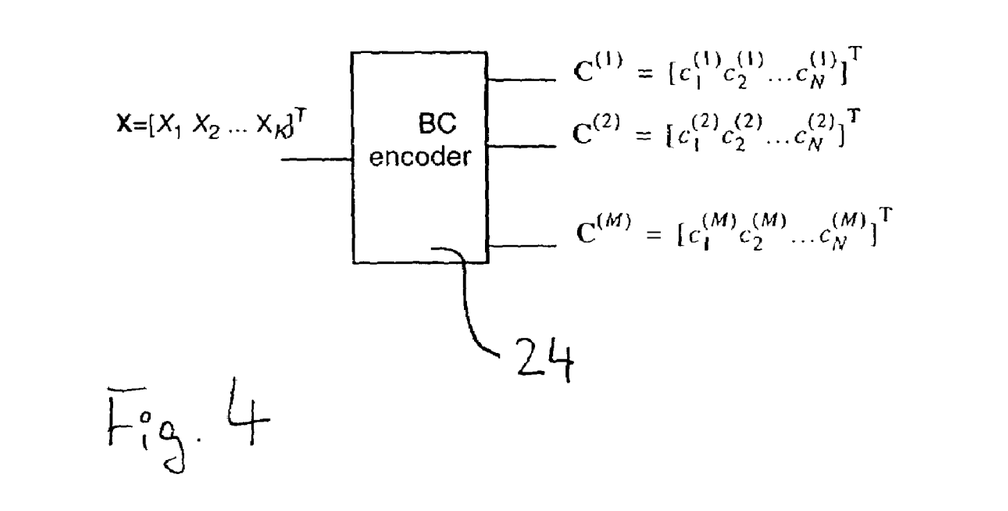
FIG. 4 shows the block code encoder of the transceiver depicted in FIG. 2.

The function of the block code encoder 24 is now generally described with reference to FIG. 4. In general, the block code encoder 24 receives an input signal in the form of a sequence of vectors $X=[X_1 X_2 \ldots X_K]^T$ of the length K. The block code encoder 24 encodes each vector X and outputs for each vector X a data block comprising a plurality of signal vectors $C^{(1)}$, $C^{(2)}, \ldots, C^{(M)}$ as depicted in FIG. 4. Each signal vector $C^{(1)}, C^{(2)}, \ldots, C^{(M)}$ corresponds to a single data word. Thus, the data block generated from the vector X comprises M data words wherein M is the number of transmitter antennas.

Each data word $C^{(i)}$ with i=1 . . . M comprises N data symbols, i.e. each data word $C^{(i)}$ has a length of N. The value of N cannot be freely chosen since the matrix C spanned by the data words $C^{(i)}$ has to be orthogonal in this embodiment. Several examples for data blocks in the form of orthogonal code matrices C are described in U.S. Pat. No. 6,088,408. In the block coding approach described in the present embodiment all data symbols $c_j^i$ of the code matrix C are derived from the components of the input vector X and are simple linear functions thereof or of its complex conjugate.

If a receive signal vector Y at one receive antenna is denoted by $Y=[Y_1 Y_2 \ldots Y_N]^T$, the relationship between Y and the code matrix C is as follows:

$$\begin{bmatrix} Y_1 \\ Y_2 \\ \ldots \\ Y_N \end{bmatrix} = \begin{bmatrix} c_1^1 & c_1^2 & \cdots & c_1^{(M)} \\ c_2^1 & \cdots & & c_2^{(M)} \\ \cdots & \cdots & \cdots & \cdots \\ c_N^{(1)} & c_N^{(2)} & \cdots & c_N^{(M)} \end{bmatrix} \cdot \begin{bmatrix} h^1 \\ h^2 \\ \ldots \\ h^{(M)} \end{bmatrix} \quad (5)$$

where $h^{(i)}$ represents the channel coefficient of the channel from the i-th transmit antenna to the receive antenna. A generalization to more receive antennas is straightforward.

Figure 5:
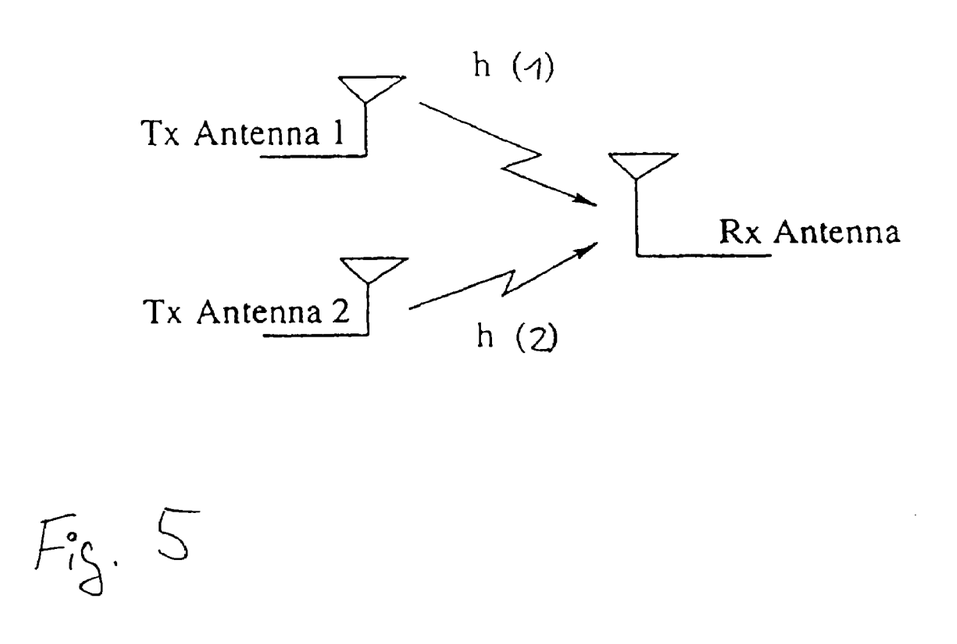
FIG. 5 shows the configuration of a transmit antenna diversity scheme.

In the following examples of possible block code matrices for two and three transmitter antennas, respectively, are discussed in more detail. The configuration of a wireless communication system with two transmit antennas and one receive antenna is depicted in FIG. 5. For two transmit antennas one possible block code matrix C with a code rate R=1 is:

$$C = \begin{bmatrix} X_1 & X_2 \\ -X_2^* & X_2^* \end{bmatrix} \quad (6)$$

For three transmit antennas one possible block code matrix C with a code rate R=0,5 is:

$$C = \begin{bmatrix} X_1 & X_2 & X_3 \\ -X_2 & X_1 & -X_4 \\ -X_3 & X_4 & X_1 \\ -X_4 & -X_3 & X_2 \\ X_1^* & X_2^* & X_3^* \\ -X_2^* & X_1^* & -X_4^* \\ -X_3^* & X_4^* & X_1^* \\ -X_4^* & -X_3^* & X_2^* \end{bmatrix} \quad (7)$$

The code rate R is defined as the ratio of the length K of the input vector X and the length N of each code word $C^{(i)}$:

$$R=K/N \quad (8)$$

As can be seen from FIG. 4, the block code encoder 24 outputs for each data signal in the form of a vector X a data block in the form of a matrix C. The data block output by the block code encoder 24 is input into the multiplexer 26 which multiplexes the data words (vectors $C^{(i)}$) of each data block in accordance with an externally provided control signal either in the time domain or in the frequency domain. The control signal is generated by the control unit 32 based on an assessment of the transmission constraints. The assessment of the transmission constraints and the controlling of the multiplexer 26 by means of the control unit 32 will be described later in more detail.

In the multicarrier scheme OFDM, the output of the block code encoder 24 is modulated onto subcarriers which are orthogonal to each other. There exist essentially two possibilities to multiplex a data block comprising individual data words in an OFDM system. According to a first possibility depicted in FIG. 6, the data words of a specific data block are extended in the time direction (STBC). In other words: The data words are multiplexed in the time domain. According to a second possibility, the data words of a data block are extended in the frequency direction as depicted in FIG. 7. This means that the data words are multiplexed in the frequency domain. Multiplexing the data words of a data block in the form of a code matrix in the frequency domain will in the following be referred to as space-frequency block coding (SFBC).

Figure 6:
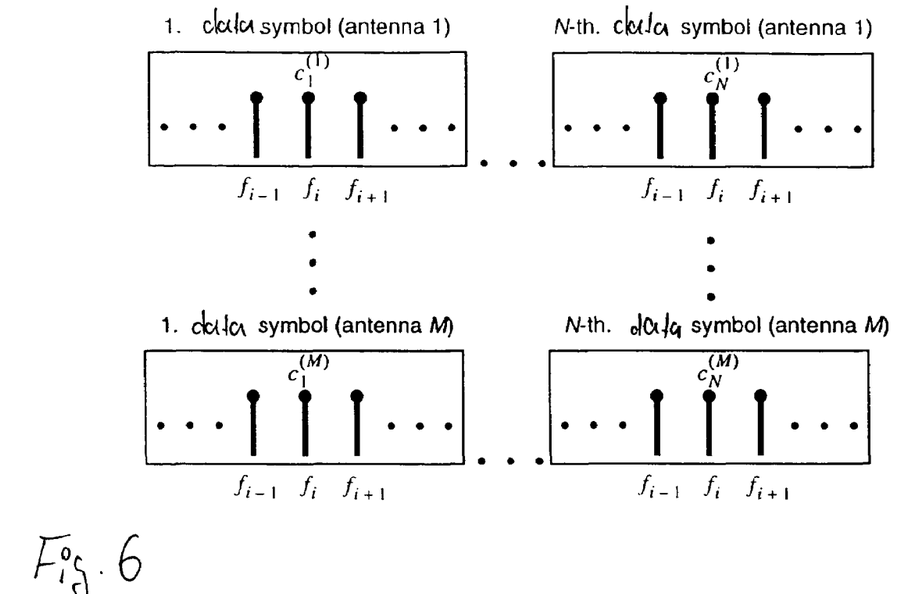
FIG. 6 is a schematic diagram of multiplexing data words in the time domain.
Figure 7:
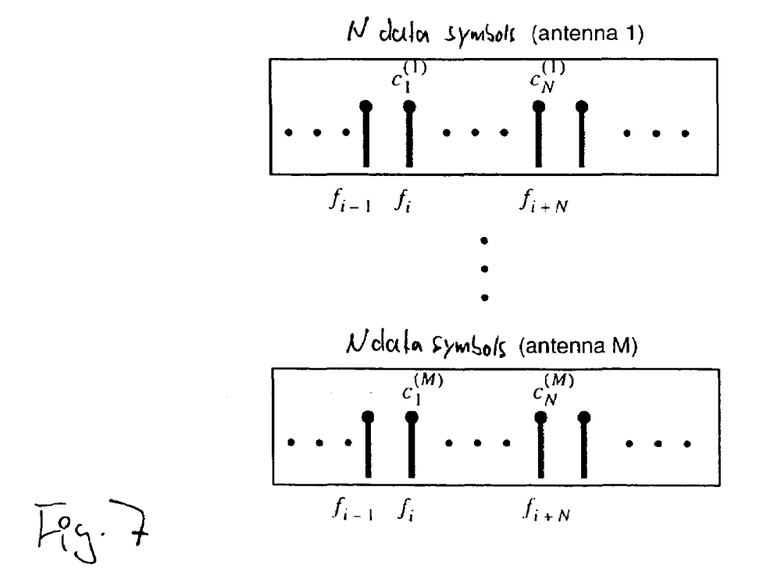
FIG. 7 is a schematic diagram of multiplexing data words in the frequency domain.

As can be seen from FIGS. 6 and 7, the individual data words of a data block are transmitted from different transmit antennas. According to the multiplexing scheme of FIG. 6, an individual data block is transmitted on an individual subcarrier over a time interval of N·T, wherein N is the number of data symbols per data word and T is the duration of one of the data symbols. According to the multiplexing scheme of FIG. 7, an individual data block is spread over N subcarriers and is transmitted during a time interval of T. It can clearly be seen that the multiplexing scheme of FIG. 6 can generally be employed when the relation (4) is fulfilled and the multiplexing scheme of FIG. 7 can generally be employed when the relation (3) is satisfied.

The encoded and multiplexed output signal of the encoder/multiplexer unit 28 is input into the radio transmitter 30. The radio transmitter 30 performs radio transmission over a plurality of transmit antennas by modulating a radio frequency carrier with the output signal of the encoder/multiplexer unit 28. The transceiver 10 of FIG. 2 further comprises a receiver stage not depicted in FIG. 2. The receiver stage has a physical layer with components for performing the inverse operations of the components depicted in FIG. 2. For example, the receiver stage comprises a descrambler, a FEC decoding unit, a demultiplexer/decoder unit with a demultiplexer and a block code decoder, etc.

Now, the control of the multiplexer 26 will be described in more detail with reference to both physical and data-related transmission constraints that may occur if physical bursts as the one depicted in FIG. 1 are employed. In accordance with typical HIPERLAN/2 scenarios, it is supposed that relation (4) is fulfilled and that it cannot always be guaranteed that relation (3) is fulfilled. This corresponds to the realistic situation that the basic performance of STBC transmission is better than the basic performance of SFBC transmission. Basic performance here means that only physical transmission constraints are taken into account. In such a case the control unit 32 may decide that the data blocks have to be multiplexed in the time domain. However, if the physical transmission parameters change, there might occur the case where relation (4) is no longer fulfilled whereas relation (3) is fulfilled at least approximately. In this case the control unit 32 will decide that the data words of the data blocks are no longer multiplexed in the time domain. Instead, the control unit 32 controls the multiplexer 26 such that the data words of the data blocks are multiplexed in the frequency domain.

So far only physical transmission constraints have been considered. Should data-related transmission constraints also be of importance, the control unit 32 controls the multiplexer 26 by additionally taking into account data-related transmission constraints.

It has been mentioned above that the transmission constraints which have to be considered in context with the physical burst depicted in FIG. 1 are the preservation of a periodic structure in the C-preamble and the provision of a predefined number N of data symbols in each data word which is to be multiplexed in the time domain. These two data-related transmission constraints can occur in several combinations.

According to a first scenario, the data signal has the structure of the physical burst depicted in FIG. 1 and comprises a user data section and a preamble with a periodic structure. It is further supposed that the data-related transmission constraint of preserving the periodic structure has to be taken into account while no data symbol fitting problem occurs with respect to the user data section. In such a case the data words of data blocks relating to the preamble are multiplexed in accordance with SFBC in the frequency domain and the data words of data blocks relating to the user data section are multiplexed in accordance with STBC in the time domain. By multiplexing the data words derived from the preamble in the frequency domain a preservation of the order of the C32 OFDM symbols and the two C64 OFDM symbols can be achieved.

According to a second scenario derived from the physical burst depicted in FIG. 1, the periodic structure within the preamble has to be preserved and additionally the data symbol fitting problem has to be taken into account with respect to the user data section. Like in the first scenario, the data words of data blocks derived from the preamble are multiplexed in accordance with SFBC in the frequency domain. Due to the data symbol fitting problem the data words of the last data block relating to the user data structure contains less than the predefined number N of data symbols contained in data words of the previous data blocks. Therefore, only the data words (containing the predefined number N of data symbols) of the previous data blocks are multiplexed in accordance with STBC in the time domain. The data words of the last data block contain $N_R = \text{mod}(N_D/N)$ data symbols and are multiplexed in accordance with SFBC in the frequency domain, wherein $N_D$ is the total number of data symbols to be transmitted over one transmit antenna.

According to a third scenario, the data-related transmission constraint of the preservation of a periodic structure within the preamble is not relevant but the data symbol fitting problem is relevant with respect to the user data section. In this case the data words of data blocks relating to the preamble are multiplexed in accordance with STBC in the time domain and the data words of data blocks relating to the user data section are multiplexed as described above for the second scenario. In other words: The data words of the last data block have a length of $N_R$ data symbols and the data words of the previous data blocks have the predefined length of N data symbols.

According to a fourth scenario, the data-related transmission constraint of preserving a periodic structure has not to be taken into account and the physical transmission constraint of $B_C \gg N/T$ is at least approximately fulfilled. In this case the data words of data blocks relating to the preamble are multiplexed in accordance with STBC in the time domain and the data words of data blocks relating to the user data section are multiplexed in accordance with SFBC in the frequency domain. By using STBC for the preamble a good channel estimation can be performed. Due to the use of STBC for the preamble the slightly worse performance of SFBC can be compensated by means of receiver algorithms for interference suppression based on the good channel estimation. Using STBC for the preamble and SFBC for the user data section has the advantage that data symbol fitting problems with respect to the user data section do not appear.

Additional scenarios based on further combinations of data-related and physical transmission constraints can easily be realized. Also, the technology can easily be applied to data signals having a structure different from the structure of the physical burst depicted in FIG. 1. Although the technology is preferably practiced with the transmit diversity scheme of a combination of STBC and SFBC, other transmit diversity schemes can be used as well.

The invention claimed is:

1. A method of multiplexing data words in a multicarrier transmit diversity system, comprising:
    a) generating a plurality of data blocks, each data block comprising data words and each data word containing data symbols derived from a data signal;
    b) determining for one or more data blocks in dependence on at least one transmission constraint if the data words of said one or more data blocks are to be multiplexed in space-time or in space-frequency, wherein the transmission constraint comprises a data-related transmission constraint relating to a pre-defined number of data symbols to be comprised within each data word which is to be multiplexed in space-time, and wherein the data words containing the predefined number of data symbols are multiplexed in space-time and the data words containing more or less data symbols are multiplexed in space-frequency; and
    c) multiplexing the data words of the data blocks in accordance with the determination in step b).

2. The method according to claim 1,
wherein the data signal comprises at least one of a preamble and a user data section.

3. The method according to claim 1,
wherein the data signal or a portion thereof has a predefined length and wherein integer multiples of the predefined number of data symbols are arranged in data blocks with data words which are multiplexed in space-time and a remainder of data symbols is arranged in data blocks with data words which are multiplexed in space-frequency.

4. The method according to claim 3,
wherein the user data section of the data signal has the predefined length.

5. The method according to claim 4,
wherein the data words of data blocks relating to the preamble are either multiplexed completely in space-frequency or completely in space-time dependent on the transmission constraint.

6. The method according to claim 1,
wherein the data signal comprises one or more periodic structures.

7. The method according to claim 6,
wherein the one or more periodic structures are contained within the preamble.

8. The method according to claim 6,
wherein the data-related transmission constraint is a preservation of the one or more periodic structures.

9. The method according to claim 6,
wherein at least the data words of data blocks relating to the periodic structures are multiplexed in space-frequency.

10. The method according to claim 9,
wherein the data words of data blocks relating to the user data section are multiplexed in space-time.

11. The method according to claim 1,
wherein the at least one transmission constraint comprises a physical transmission constraint.

12. The method according to claim 11,
wherein the physical transmission constraint is determined based on at least one of a coherence bandwidth and a coherence time.

13. The method according to claim 12,
wherein the physical transmission constraint is determined by assessing if the relationship $B_C \gg N/T$ is fulfilled, wherein $B_C$ is the coherence bandwidth, N is the number of data symbols per data word and T is the duration of one of the data symbols.

14. The method according to claim 12,
wherein the physical transmission constraint is determined by assessing if the relationship $t_C \gg N \cdot T$ is fulfilled, wherein $t_C$ is the coherence time, N is the number of data symbols per data word and T is the duration of one of the data symbols.

15. The method according to claim 13,
wherein, when the physical transmission constraint $B_C \gg N/T$ is at least approximately fulfilled, the data words of data blocks relating to the preamble are multiplexed in space-time and the data words of data blocks relating to the user data sequence are multiplexed in space-frequency.

16. The method according to claim 1,
wherein the data blocks are obtained from the data signal by means of block coding or by means of permutation.

17. The method according to claim 1,
wherein the data symbols are modulated onto subcarriers which are orthogonal to each other.

18. A device for multiplexing data words, comprising:
a) an encoder for generating a plurality of data blocks, each block comprising data words and each data word containing data symbols derived from a data signal;
b) a control unit for determining for one or more data blocks in dependence on at least one transmission constraint if the data words of said one or more data blocks are to be multiplexed in space-time or in space-frequency, wherein the transmission constraint comprises a data-related transmission constraint relating to a predefined number of data symbols to be comprised within each data word which is to be multiplexed in space-time, and wherein the data words containing the predefined number of data symbols are multiplexed in space-time and the data words containing more or less data symbols are multiplexed in space-frequency; and
c) a multiplexer for multiplexing the data words of the data blocks in accordance with the determination made by the control unit.

19. A transceiver for wireless communication, comprising the device according to claim 18.

20. The device according to claim 18,
wherein at least the data words of data blocks relating to the periodic structures are multiplexed in space-frequency, and
wherein the data words of data blocks relating to the user data section are multiplexed in space-time.

21. The device according to claim 18,
wherein the at least one transmission constraint comprises a physical transmission constraint,
wherein the physical transmission constraint is determined by assessing if the relationship $B_C \gg N/T$ is fulfilled, wherein $B_C$ is the coherence bandwidth, N is the number of data symbols per data word and T is the duration of one of the data symbols.

22. The device according to claim 18,
wherein the at least one transmission constraint comprises a physical transmission constraint,
wherein the physical transmission constraint is determined by assessing if the relationship $t_C \gg N \cdot T$ is fulfilled, wherein $t_C$ is the coherence time, N is the number of data symbols per data word and T is the duration of one of the data symbols.

23. A device for multiplexing data words, comprising:
a) an encoder for generating a plurality of data blocks, each block comprising data words and each data word containing data symbols derived from a data signal;
b) a control unit for determining for one or more data blocks in dependence on at least one transmission constraint if the data words of said one or more data blocks are to be multiplexed in space-time or in space-frequency, wherein the transmission constraint comprises a data-related transmission constraint relating to a preservation of one or more periodic structures in the data signal; and
c) a multiplexer for multiplexing the data words of the data blocks in accordance with the determination made by the control unit.

24. A transceiver for wireless communication, comprising the device according to claim 23.

25. The device according to claim 23,
wherein at least the data words of data blocks relating to the periodic structures are multiplexed in space-frequency, and
wherein the data words of data blocks relating to the user data section are multiplexed in space-time.

26. The device according to claim 23,
wherein the at least one transmission constraint comprises a physical transmission constraint,
wherein the physical transmission constraint is determined by assessing if the relationship $B_C \gg N/T$ is fulfilled, wherein $B_C$ is the coherence bandwidth, N is the number of data symbols per data word and T is the duration of one of the data symbols.

27. The device according to claim 23,
wherein the at least one transmission constraint comprises a physical transmission constraint,
wherein the physical transmission constraint is determined by assessing if the relationship $t_C \gg N \cdot T$ is fulfilled, wherein $t_C$ is the coherence time, N is the number of data symbols per data word and T is the duration of one of the data symbols.

* * * * *